US008054345B2

(12) United States Patent
Matsumura

(10) Patent No.: US 8,054,345 B2
(45) Date of Patent: Nov. 8, 2011

(54) ELECTRONIC ZOOMING APPARATUS AND DIGITAL CAMERA

(75) Inventor: Hideki Matsumura, Kyoto (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 480 days.

(21) Appl. No.: 12/175,780

(22) Filed: Jul. 18, 2008

(65) Prior Publication Data

US 2009/0021608 A1 Jan. 22, 2009

(30) Foreign Application Priority Data

Jul. 19, 2007 (JP) ................................ 2007-188101

(51) Int. Cl.
*H04N 5/262* (2006.01)
*G06K 9/32* (2006.01)

(52) U.S. Cl. .................................... 348/240.2; 382/298

(58) Field of Classification Search ............... 348/240.2; 382/282, 298–300

See application file for complete search history.

(56) References Cited

U.S. PATENT DOCUMENTS 5,845,011 A * 12/1998 Miyamoto et al. ............ 382/232
6,762,792 B1 * 7/2004 Matsumura ................ 348/240.2
6,798,927 B2 * 9/2004 Kosugi et al. ................ 382/299
6,801,250 B1 * 10/2004 Miyashita .................. 348/220.1
6,947,082 B2 9/2005 Gomi
7,142,236 B2 * 11/2006 Matsumura .............. 348/240.99
7,142,237 B2 * 11/2006 Nozawa ..................... 348/240.2
7,372,488 B2 * 5/2008 Kubo ............................ 348/266
7,589,778 B2 * 9/2009 Nakahira ................. 348/333.01
7,782,343 B2 * 8/2010 Lai ................................ 345/660
2003/0086007 A1 * 5/2003 Sasai .......................... 348/240.2
2004/0218835 A1 * 11/2004 Loew ............................ 382/299
2007/0071360 A1 * 3/2007 Kuroki et al. ................ 382/298
2009/0034877 A1 * 2/2009 Kefeder ....................... 382/298

FOREIGN PATENT DOCUMENTS

JP 2002-199266 A 7/2002
JP 2002-320135 A 10/2002
JP 2002-330329 A 11/2002
JP 2004104726 A * 4/2004
JP 2007-124542 A 5/2007

OTHER PUBLICATIONS

English translation of Japanese Office Action dated May 24, 2011, issued in corresponding Japanese Patent Application No. 2007-188101 submitted with IDS filed May 27, 2011.
Japanese Office Action dated May 24, 2011, issued in corresponding Japanese Patent Application No. 2007-188101.

* cited by examiner

*Primary Examiner* — John M Villecco
(74) *Attorney, Agent, or Firm* — Westerman, Hattori, Daniels & Adrian, LLP

(57) ABSTRACT

A digital camera includes a memory, and pixel data cut out from the memory is subjected to ½ horizontal thinning processing by a ½ horizontal thinning circuit when a zooming magnification is equal to or larger than “2”, and the thinned pixel data is written to an image buffer. A zooming circuit performs zooming processing on the thinned pixel data stored in the image buffer. Here, when the zooming magnification is smaller than “2”, the zooming circuit performs the zooming processing on original pixel data being read from the memory and then stored in the image buffer.

4 Claims, 5 Drawing Sheets

10
26 MEMORY
24 MEMORY CONTROL CIRCUIT
· REQ
· X_ADRS
· Y_ADRS
12
16 CAMERA PROCESSING
42 SG
32 BUFFER CONTROLLER
BANK EXCHANGE SIGNAL
IMAGE BUFFER
30 1/2H THINNING CIRCUIT
34 BANK A BANK B
36 ZOOMING CIRCUIT
1/n
18 CPU
· 1/n
· Xs, Ys
20 I/F
22 MEMORY CARD
38 VIDEO ENCODER
40 DISPLAY
14 KEY INPUT DEVICE 10
26
MEMORY
24
MEMORY CONTROL CIRCUIT
・REQ
・X_ADRS
・Y_ADRS
12
16
CAMERA PROCESSING
42
SG
32
BUFFER CONTROLLER
BANK EXCHANGE SIGNAL
IMAGE BUFFER
30
1/2H THINNING CIRCUIT
34
BANK A
BANK B
36
ZOOMING CIRCUIT
1/n
18
CPU
・1/n
・Xs, Ys
VIDEO ENCODER
38
I/F
20
22
MEMORY CARD
40
DISPLAY
14
KEY INPUT DEVICE

ELECTRONIC ZOOMING APPARATUS AND DIGITAL CAMERA

CROSS REFERENCE OF RELATED APPLICATION

The disclosure of Japanese Patent Application No. 2007-188101 filed on Jul. 19, 2007 is incorporated herein by reference.

BACKGROUND OF THE INVENTION

1. Field of the Invention

The present invention relates to an electronic zooming apparatus. More specifically, the present invention relates to an electronic zooming apparatus which is applied to a digital camera and generates zoomed image data according to an instructed zooming magnification.

2. Description of the Related Art

In an example of such a kind of conventional electronic zooming apparatus, pixel data read from a memory is subjected to zooming processing by a zooming interpolation circuit (zooming processing circuit), and the zoomed image data is converted into an NTSC composite signal, for example, by a video encoder, and then, the NTSC composite signal is displayed on an LCD display.

In the related art, since the pixel data read from the memory is directly applied to the zooming processing circuit, a smooth continuous zooming is possible while degradation of picture quality may occur when a large magnification zooming is performed.

For example, as shown in FIG. 1, in a case of 2 times (×2) zooming, a pixel 21*a* is produced from pixels 1, 2 of a memory ("original pixel"), and a pixel 22*a* is produced from original pixels 3, 4, . . . and the same is applied onward. In a case of 3 times (×3) zooming, a pixel 31*a* is produced from the original pixels 1, 2, a pixel 32*a* is produced from the original pixels 4, 5, . . . and the same is applied onward. However, in the case of 3 times zooming, there are some pixels on which the original pixels are not reflected out of the pixels after the zooming processing. That is, the original pixels 3, 6, . . . are missed. Accordingly, at a time of 3 times or larger magnification zooming, degradation of picure quality occurs.

SUMMARY OF THE INVENTION

Therefore, it is a primary object of the present invention to provide a novel electronic zooming apparatus and a novel digital camera.

The present invention is an electronic zooming apparatus comprising a first reader for reading a predetermined amount of original pixel data which is horizontally continuous from a designated pixel decided on the basis of a zooming magnification out of image data stored in a first memory; a horizontal thinner for outputting thinned pixel data by performing 1/n times (n is natural number) thinning processing in a horizontal direction on the original pixel data read by the first reader when a zooming magnification is equal to or larger than n, and outputting the original pixel data as it is when the zooming magnification is smaller than n; a second memory being written with the thinned pixel data or the original pixel data; a second reader for reading the original pixel data from the second memory when the zooming magnification is smaller than n, and reading the thinned pixel data from the second memory when the zooming magnification is equal to or larger than n; and a zooming processor for producing a zoomed image by performing zooming processing on the thinned pixel data or the original pixel data read by the second reader.

According to the present invention, it is possible to obtain a novel electronic zooming apparatus.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 2:
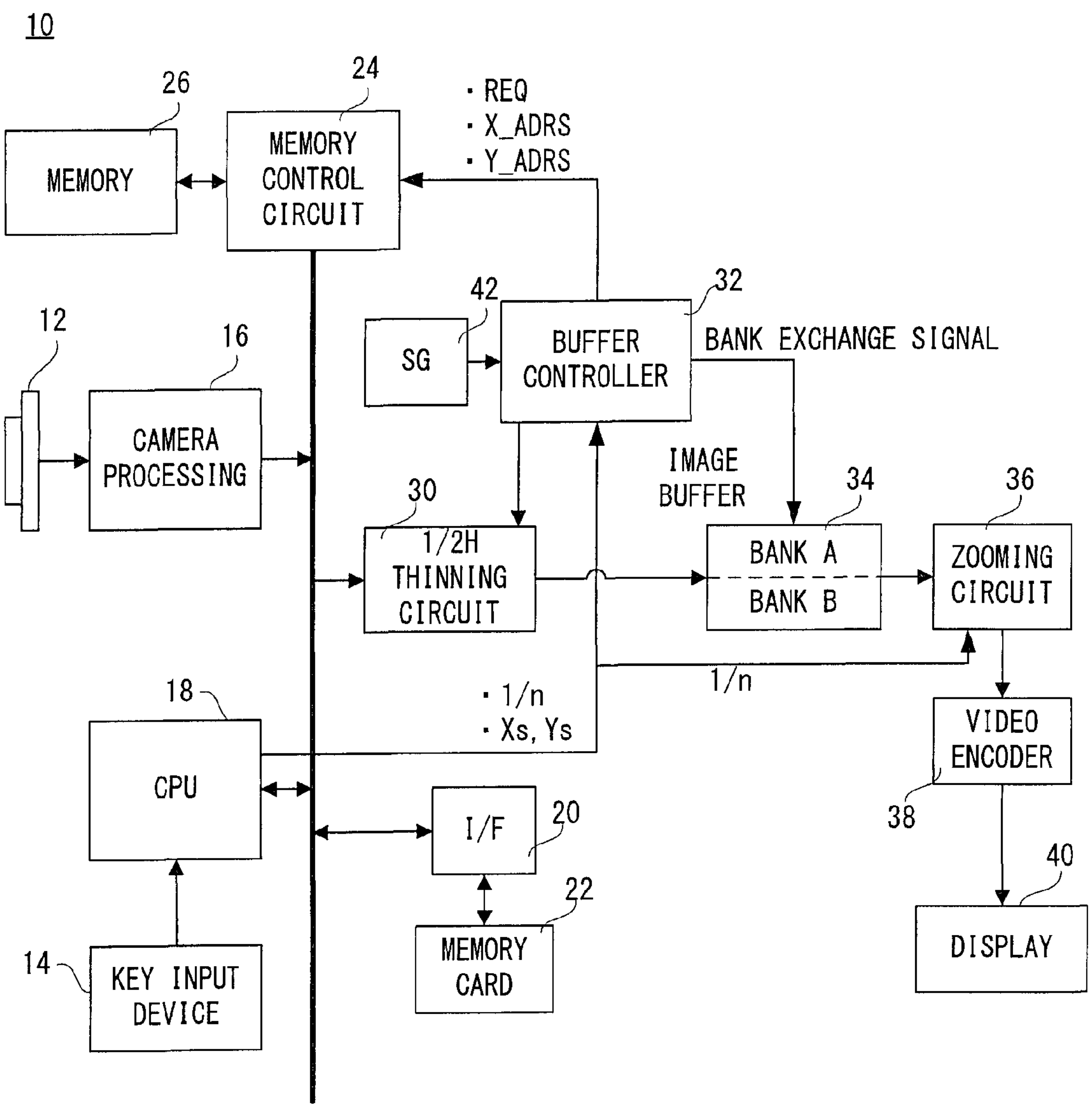
FIG. 2 is a block diagram showing a configuration of one embodiment of the present invention.

With reference to FIG. 2, a digital camera 10 of this embodiment includes an imaging device 12. When a camera mode is selected by a key input device 14 and a shooting operation is performed, the imaging device 12 and a camera processing circuit 16 are started by a CPU 18. The imaging device 12 outputs one frame of a raw image signal (electric charge) corresponding to an optical image of an object scene, and the camera processing circuit 16 generates image data being a digital signal on the basis of the raw image signal which is output from the imaging device 12. The generated image data is recorded in a memory card 22 in a file format through an I/F circuit 20. That is, in the camera mode, every time that a shooting operation is performed, one frame of image data is generated, and an image file storing the generated image data is recorded in the memory card 22.

Furthermore, one frame of image data has a resolution of 640 pixels in horizontal×480 pixels in vertical as one example. Furthermore, the memory card 22 is a detachable recording medium, and is made accessible when it is loaded into a slot (not illustrated) by the I/F circuit 20.

When a reproduction mode is selected by the key input device 14, the CPU 18 accesses the memory card 22 through the I/F circuit 20 to read the one frame of image data recorded in the memory card 22. The read image data is written to a memory (first memory) 26 such as an SDRAM by a memory control circuit 24.

After completion of writing the image data, the CPU 18 sets a zooming coefficient (1/n) which is an inverse number of a instructed zooming magnification (n) arbitrarily instructed by the key input device 14 and a starting address (Xs, Ys) to a buffer controller 32. The buffer controller 32 outputs a reading request to the memory control circuit 24 in order to read in a raster scanning manner the image data in a zooming area that is defined on the basis of the set zooming coefficient and starting address from the memory 26.

Figure 3:
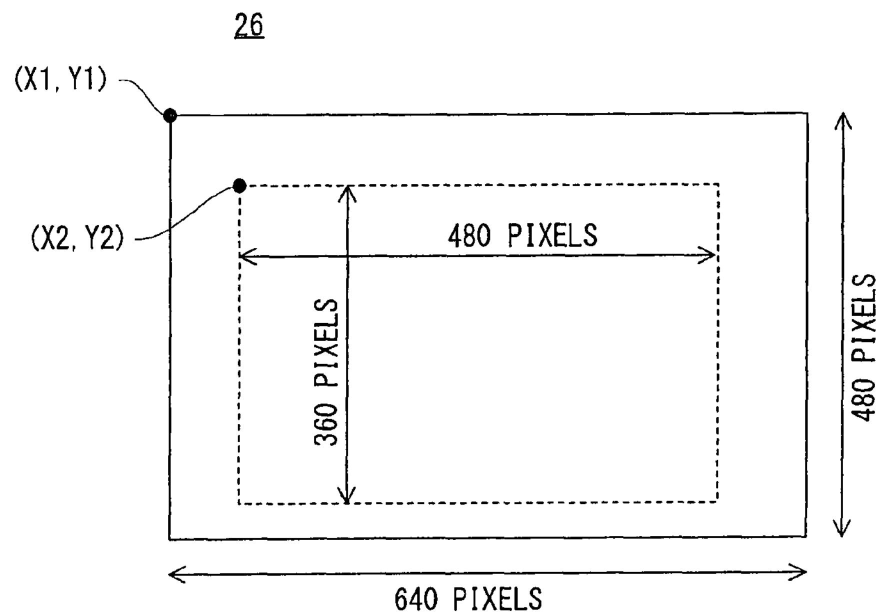
FIG. 3 is an illustrative view showing a mapped state of a designated area on a memory applied to the embodiment in FIG. 2.

For example, as shown in FIG. 3, when the instructed zooming magnification is "1.0", an area of 640 pixels in horizontal×480 pixels in vertical which regards a starting address (Xs, Ys)=(X1, Y1) as a reference address is assigned to the memory 26 as a zooming area. Furthermore, if the instructed zooming magnification is "1.5", and an area of 480 pixels in horizontal X 360 pixels in vertical which regards a starting address (Xs, Ys)=(X2, Y2) as a reference address is assigned to the memory 26 as a zooming area (cut-out area).

Here, the instructed zooming magnification instructed by the key input device 14 is also applied to a zooming circuit 36 described later.

Figure 4:
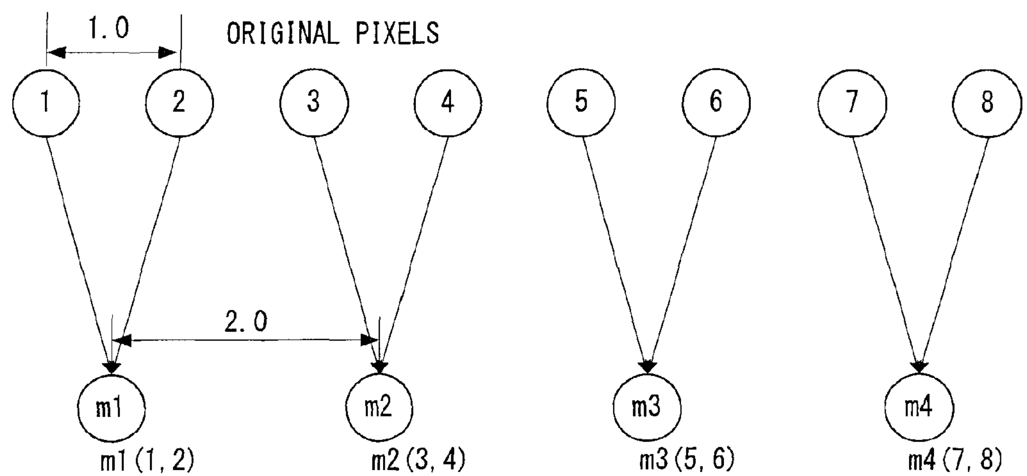
FIG. 4 is an illustrative view showing one example of thinning processing by a ½ horizontal thinning circuit in the embodiment in FIG. 2.

The memory control circuit 24 reads pixel data of 144 pixels being continuous in a horizontal direction from the memory 26 every time that a reading request (REQ) is applied. The pixel data is input to a ½ horizontal (H) thinning circuit 30. The ½ horizontal thinning circuit 30 includes a digital low-pass filter, for example, and performs thinning-out processing on original pixels (original pixel data) read from the memory 26 such that two pixel data horizontally adjacent to each other is averaged to produce one thinned pixel data m1, m2 . . . as shown in FIG. 4. Then, data of the pixels after the thinning-out processing (referred to as "thinned pixel") is input to the image buffer 34 as a second memory.

Here, the ½ horizontal thinning circuit 30 is activated or not activated by the buffer controller 32. When the ½ horizontal thinning circuit 30 is activated, the above-described thinned pixel is applied to the image buffer 34 while when it is not activated, the memory control circuit 24 directly applies the original pixel data read from the memory 26 to the image buffer 34.

As explained later, a case that the ½ horizontal thinning circuit 30 is used, that is, it is activated is only when the zooming coefficient is equal to or smaller than ½, that is, the zooming magnification is equal to or larger than "2".

The image buffer 34 is formed with two banks A and B each capable of storing image data of 144 pixels. When the ½ horizontal thinning circuit 30 is not activated, that is, when the zooming magnification is smaller than "2", in response to one reading request (REQ), original pixel data of 144 pixels transferred from the memory 26 through the ½ horizontal thinning circuit 30 is alternately written to the banks A and B. On the other hand, when the ½ horizontal thinning circuit 30 is activated, that is, when the zooming magnification is equal to or larger than "2", original pixel data of 144 pixels is read from the memory 26 in response to one reading request (REQ), but by execution of the ½ horizontal thinning processing in the ½ horizontal thinning circuit 30, thinned pixel data of 72 pixels is alternately be written to the banks A and B every reading request. Then, in either case, the pixel data of the bank in which writing has not been performed out of the banks A and B is read by the zooming circuit 36.

The zooming circuit 36 performs zooming processing on the pixel data read from the image buffer 34 according to the instructed zooming magnification. Zoomed image data produced by the zooming processing has a resolution of 640 pixels in horizontal×480 pixels in vertical regardless of the instructed zooming magnification.

Figure 1:
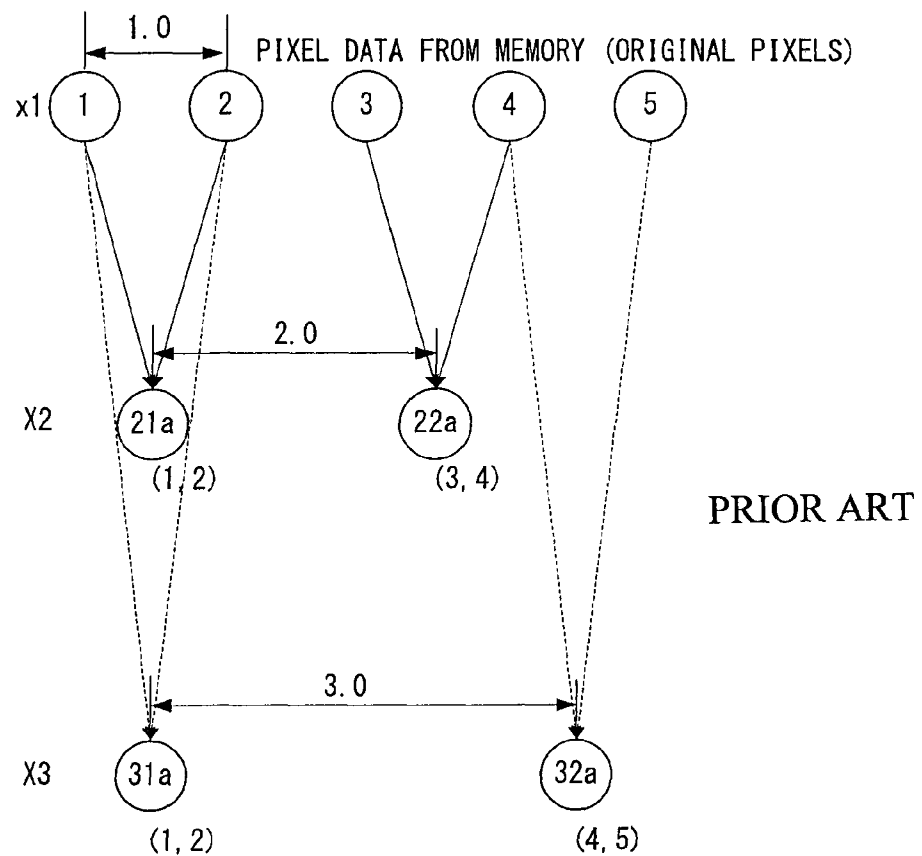
FIG. 1 is an illustrative view showing one example of conventional zooming processing.

Generally, the zooming circuit 36 executes the well-known zooming processing shown in FIG. 1. In a case that the zooming magnification is "1" (×1), the original pixel data is output as it is. In a case that the zooming magnification is "2", a display pixel 21*a* for a zoomed image is produced by the original pixel 1 and the original pixel 2, a display pixel 22*a* is produced by the original pixel 3 and the original pixel 4, and the same is applied onward. Such zooming processing can be applied to a case that the thinned pixel data which has been subjected to ½ horizontal thinning processing in the ½ horizontal thinning circuit 30 is employed.

Figure 5:
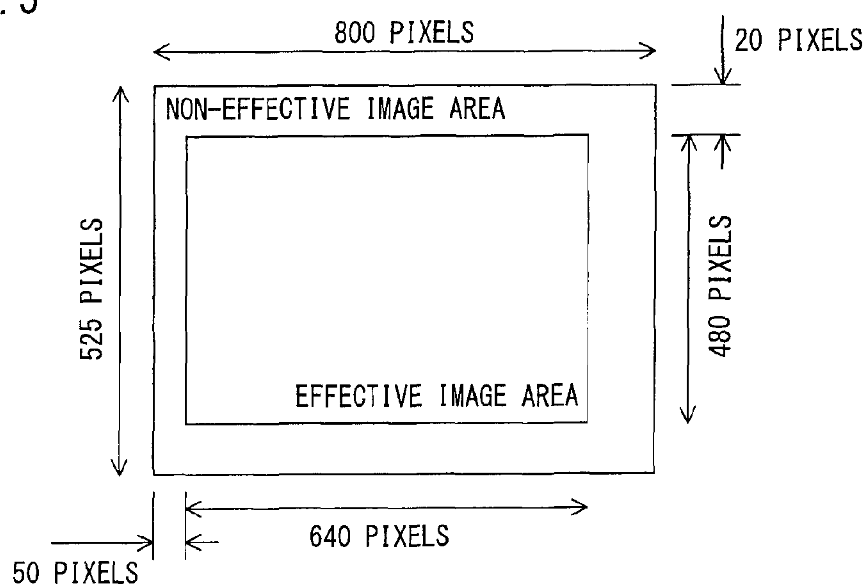
FIG. 5 is an illustrative view showing one example of an image signal applied to an LCD display.

Furthermore, a video encoder 38 generates a composite image signal according to an NTSC standard on the basis of the pixel data for display of the zoomed image output from the zooming circuit 36. The generated composite image signal is applied to the LCD display 40. Consequently, a still image having a desired zooming magnification is displayed on the monitor screen. Here, the composite signal has an effective image area of 640 pixels in horizontal×480 pixels in vertical as one example as shown in FIG. 5. The size of the composite image signal further including a non-effective area is 800 pixels in horizontal×525 pixels in vertical.

Figure 6:
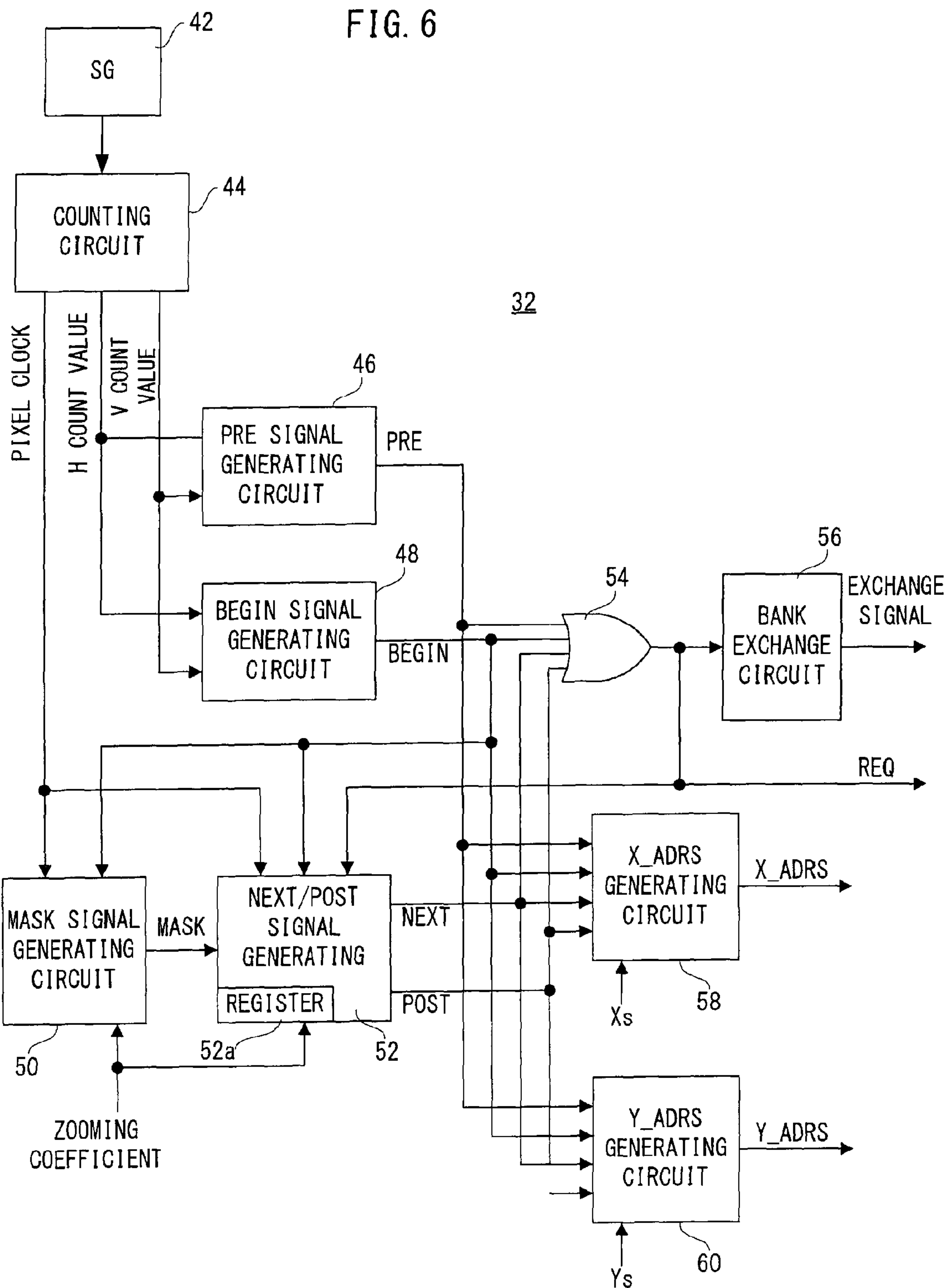
FIG. 6 is a block diagram showing one example of a configuration of a buffer control circuit applied to the embodiment in FIG. 2.

The buffer controller 32 is constructed as shown in FIG. 6 in this embodiment. A counting circuit 44 included in the buffer controller 32 counts a reference clock from an SG 42 to output an H count value, a V count value and a pixel clock. To be more specific, an oscillation frequency signal (reference clock signal) applied from the SG 42 is output from the counting circuit 44 as a pixel clock as it is. An H counter not shown outputs an H count value varying in the range of "0"-"799" by counting the reference clock. A V counter not shown outputs a V count value varying in the range of "0"-"524" in response to the reference clock by being incremented every H count value.

It should be noted that the H count value and the V count value are also employed in encoding processing by the video encoder 38. Accordingly, scanning timing of a composite image signal shown in FIG. 5 is defined by an H count value and a V count value from the counting circuit 44.

A PRE signal generating circuit 46 generates a PRE signal (start signal within 1H immediately before) on the basis of the H count value and the V count value. The aforementioned reading request (REQ signal, X_ADRS, Y_ADRS) is applied to the memory 26 every PRE signal.

A BEGIN signal generating circuit 48 generates a BEGIN signal (display starting signal) on the basis of the H count value and the V count value. In this embodiment, the BEGIN signal rises over a period from when the H count value indicates the range of "50-689" and the V count value indicates the range of "20-499". Then, in response to the BEGIN signal, a buffer exchange signal is output, so that the data from the bank A of the image buffer 34 is read and applied to the zooming circuit 36, and successive pixel data is written to the bank B.

A MASK signal generating circuit 50 generates a MASK signal (signal to define a period during which a display is masked) on the basis of the pixel clock, the BEGIN signal and the zooming coefficient applied from the CPU 18. In this embodiment, the MASK signal rises at the instant when pixel data of 144 pixels including a pixel required to generate a pixel to be displayed at an end of the horizontal direction of the effective image area shown in FIG. 5 is retained in the bank A or B of the image buffer 34, that is, at the instant when pixel data of 144 pixels including a pixel existing at the horizontal end of the zooming area shown in FIG. 3 is retained in the bank A or B, and falls at timing corresponding to the horizontal end of the effective image area.

A NEXT/POST signal generating circuit 52 generates a NEXT signal (an update signal for updating the image buffer 341) and a POST signal (start signal for a next 1 H period) on the basis of the pixel clock, the BEGIN signal, the MASK signal, the zooming coefficient and the REQ signal from an OR gate 54. The NEXT signal continues to be output until the MASK signal is output to thereby allow pixel data to be successively read from the bank A or B of the image buffer 34. However, when the MASK signal is output, this means a display prohibiting period, so that the NEXT signal is not output. It should be noted that the intervals of NEXT signals (1 W) are naturally decided by a zooming coefficient. Then, during the MASK signal, the start signal (POST) of a next 1 H is generated at a timing of NEXT signal after 1 W from the last NEXT signal.

The NEXT/POST signal generating circuit 52 is provided with a register 52*a*, and the number of words of the pixel data to be written to the image buffer 34 is set to the register 52*a* depending on the zooming coefficient (1/n) sent from the CPU 18.

In this embodiment, as described above, the ½ horizontal thinning circuit 30 is activated when the zooming magnification is two or more times (×2). The ½ horizontal thinning circuit 30 averages two original pixels being horizontally adjacent to each other to produce one thinned pixel m1, m2 . . . as shown in FIG. 4, and writes the thinned pixel data m1, m2 . . . to the image buffer 34. If the ½ horizontal thinning circuit 30 is not used, when the zooming magnification is "×1" (1.0 times), for example, the number of words to be written to the image buffer 34 is set as "18". On the contrary thereto, if the ½ horizontal thinning circuit 30 is used, that is, when the zooming magnification is "x2", for example, the number of words of "9" which is ½ times of "18" is set to the register 52*a*. Then, every time that the set number of words is counted, the NEXT signal is output. In response to the NEXT signal, the reading request REQ is output, and therefore, in a case that the ½ horizontal thinning circuit 30 is used, original pixel data twice as much as when it is not used is read from the memory 26 and applied to the ½ horizontal thinning circuit 30. Accordingly, the required number of pixel data is supplied in the image buffer 34, that is, the zooming circuit 36, so that a shortage of the pixel data in the zooming processing never occurs.

The OR gate 54 receives the PRE signal, the BEGIN signal, the NEXT signal and the POST signal, and outputs a REQ signal (reading request signal to the memory 26) in response to each of these signals. A bank exchange circuit 56 switches the writing destination of the pixel data transferred from the memory 26 between the banks A and B every time that the REQ signal is generated. The pixel data directed to the zooming circuit 36 is read from the bank not designated by the bank exchange circuit 56.

An X_ADRS generating circuit 58 generates a reading horizontal address X_ADRS of the memory 26 on the basis of the PRE signal, the BEGIN signal, the NEXT signal and the horizontal address value Xs defining the POST signal and the starting address (Xs, Ys). A Y_ADRS generating circuit 60 generates a reading vertical address Y_ADRS of the memory 26 on the basis of the PRE signal, the BEGIN signal, the NEXT signal and the vertical address value Ys defining the POST signal and the starting address (Xs, Ys). The values of the horizontal address X_ADRS and the vertical address Y_ADRS are updated by a manner corresponding to the raster scanning.

In a case of this embodiment, the X_ADRS generating circuit 58 sets the horizontal address X_ADRS to "Xs" when a PRE signal appears, increments the horizontal address X_ADRS by 144 when the BEGIN signal or the NEXT signal appears, and returns the horizontal address X_ADRS to "Xs" when the POST signal appears.

Furthermore, the Y_ADRS generating circuit 60 sets the vertical address Y_ADRS to "Ys" when the PRE signal appears, holds the value of the vertical address Y_ADRS when the BEGIN signal or the NEXT signal appears, and increments the vertical address Y_ADRS by the value according to the zooming coefficient (zooming magnification) when the POST signal appears.

In the embodiment shown in FIG. 2, when the zooming magnification designated by the user with the key input device 14 is smaller than "2", the ½ horizontal thinning circuit 30 is not used, and therefore, the zooming circuit 36 at this time adopts the conventional general processing as shown in FIG. 1.

Figure 7:
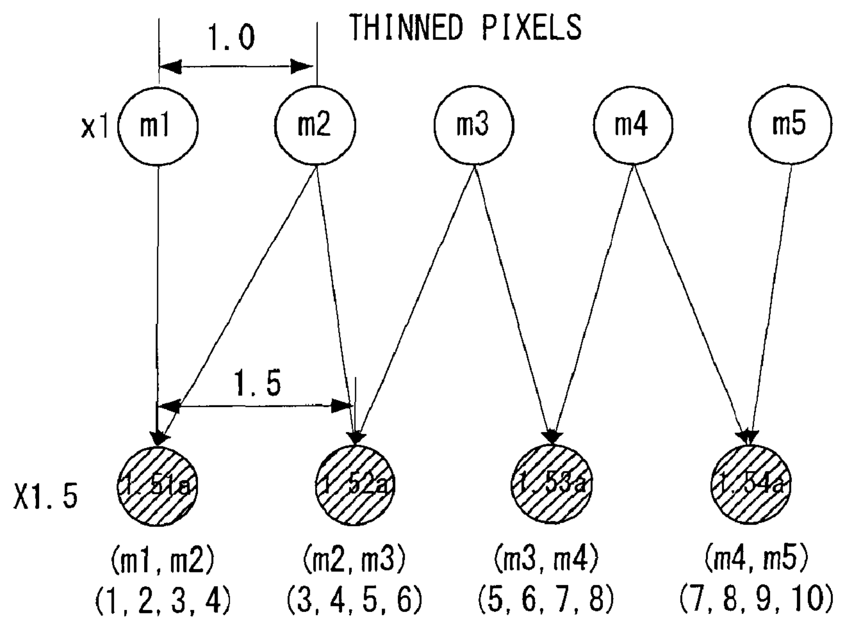
FIG. 7 is an illustrative view showing one example of zooming processing when a zooming magnification is 3 in the embodiment in FIG. 2.

When the zooming magnification designated by the user is equal to or larger than "2", that is, "3", for example, the zooming circuit 36 is instructed to be set with a zooming magnification 1.5 (zooming coefficient 1/1.5) by the CPU 18. As shown in FIG. 7, the zooming circuit 36 combines thinned pixel data m1 and m2 which has been output from the ½ horizontal thinning circuit 30 and read from the second memory, that is, the image buffer 34 to generate pixel data 1.51*a* of 1.5 times zooming, combines thinned pixel data m2 and m3 to generate next pixel data 1.52*a*, followed by the same processing to thereby successively generate pixel data for 1.5 times zoomed image.

In a case of FIG. 7, the ½ horizontal thinning circuit 30 has already performed two times processing as shown in FIG. 4, and therefore, if the zooming circuit 36 performs the 1.5 times zooming, three times (=2×1.5) zoomed image is output from the zooming circuit 36.

It should be noted that the ½ horizontal thinned pixel data is output from the memory 34 at a rate 1.5 times as fast as when the buffer controller 32 reads the original pixel data, and therefore, the zoomed image data from the zooming circuit 36 does not fall short of the display pixel of the display.

Furthermore, since the ½ horizontal thinning circuit 30 generates one thinned pixel data for every two original pixel data that being horizontally adjacent to each other, even in a case of execution of the three times zooming processing as described above, an omission of the original pixels never occurs. Accordingly, it is possible to prevent image degradation from occurring even in the three times zooming.

Figure 8:
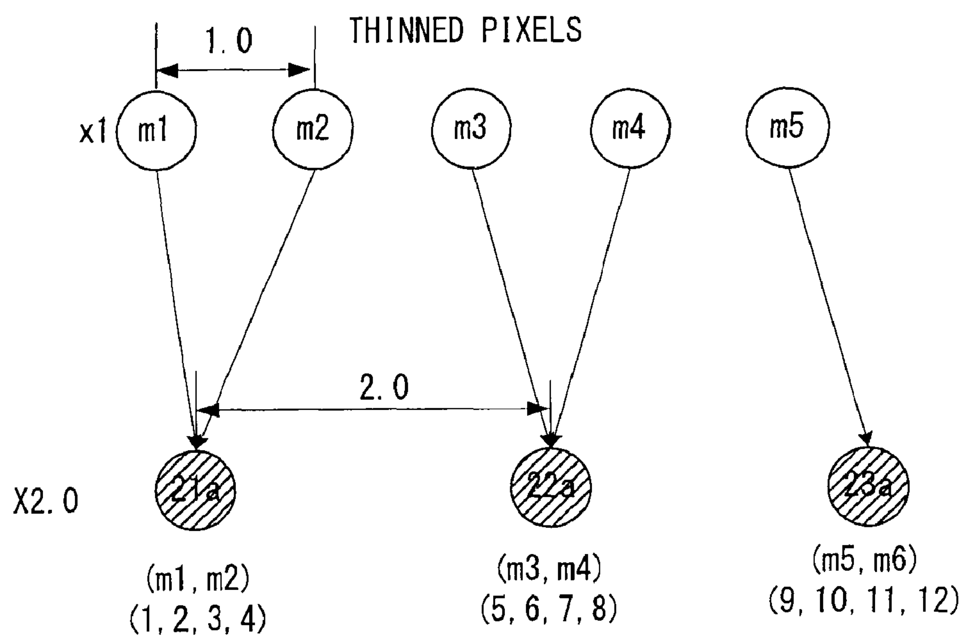
FIG. 8 is an illustrative view showing one example of zooming processing when a zooming magnification is 4 in the embodiment in FIG. 2.

In addition, when the zooming magnification designated by the user is "4", for example, the zooming circuit 36 is instructed to be set with a zooming magnification "2" (zooming coefficient 1/2.0) by the CPU 18. As shown in FIG. 8, the zooming circuit 36 combines thinned pixel data m1 and m2 which has been output from the ½ horizontal thinning circuit 30 and then read from the second memory, that is, the image buffer 34 to generate pixel data 21*a* of 2.0 times zooming, combines thinned pixel data m3 and m4 to generate next pixel data 22*a*, followed by the same processing to thereby successively generate pixel data for 2.0 times zoomed image.

In a case of FIG. 8, the ½ horizontal thinning circuit 30 has already performed two times processing, and therefore, if the zooming circuit 36 performs the 2.0 times zooming, a 4 times (=2×2.0) zoomed image is output from the zooming circuit 36.

Here, in this time also, the ½ horizontal thinned pixel data is output from the memory 34 at a rate twice as fast as when the buffer controller 32 reads the original pixel data, and therefore, the zoomed image data from the zooming circuit 36 does not fall short of the display pixel for the display. Moreover, omission of the original pixel data never occurs, so that it is possible to prevent picture quality degradation from occurring.

In the above-described embodiment, ½ horizontal thinning processing is performed by utilizing the ½ horizontal thinning circuit 30 to generate thinned pixel data m1, m2, . . . , and when the zooming designating magnification is equal to or larger than "2", an enlargement zooming is performed on the aforementioned thinned pixel data. Here, the thinning coefficient takes an arbitrary number, such as ⅓, ¼, . . . 1/n. As the thinning coefficient is small, the number of readings from the second memory has to be increased, and therefore, the thinning coefficient may be decided with a processing time period in mind. However, the thinning coefficient (n) is desirable to take a numerical value of powers of two. This is because that the circuit configuration of the 1/n horizontal thinning circuit 30 is more simplified Additionally, in the above-described embodiment, zooming processing is performed on a reproduced image from the memory card, but zooming processing may be performed on a through-image. In this case, image data stored in the memory 26 is used every shooting operation.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electronic zooming apparatus, comprising:

a first reader which reads a predetermined amount of original pixel data which is horizontally continuous from a designated pixel decided on the basis of a zooming magnification out of image data stored in a first memory;

a horizontal thinner which outputs thinned pixel data by performing 1/n times (n is natural number) thinning processing in a horizontal direction on said original pixel data read by said first reader when a zooming magnification is equal to or larger than n, and outputting said original pixel data as it is when said zooming magnification is smaller than n;

a second memory being written with said thinned pixel data or said original pixel data;

a second reader which reads said original pixel data from said second memory when said zooming magnification is smaller than n, and reading said thinned pixel data from said second memory when said zooming magnification is equal to or larger than n; and a zooming processor which produces a zoomed image by performing zooming processing on said thinned pixel data or said original pixel data read by said second reader.

2. An electronic zooming apparatus according to claim 1, wherein said n is a power of two.

3. A non-transitory recording medium which is readable by a computer of a digital camera, and which executes said digital camera to execute the following steps of:

a first reading step which reads a predetermined amount of original pixel data which is horizontally continuous from a designated pixel decided on the basis of a zooming magnification out of image data stored in a first memory;

a horizontal thinning step which outputs thinned pixel data by performing 1/n times (n is natural number) thinning processing in a horizontal direction on said original pixel data read by said first reading step when a zooming magnification is equal to or larger than n, and outputting said original pixel data as it is when said zooming magnification is smaller than n, said thinned pixel data being written to a second memory, said second memory further being written with said original pixel data;

a second reading step which reads said original pixel data from said second memory when said zooming magnification is smaller than n, and reading said thinned pixel data from said second memory when said zooming magnification is equal to or larger than n; and a zooming processing step which produces a zoomed image by performing zooming processing on said thinned pixel data or said original pixel data read by said second reading step.

4. An electronic zooming method including following steps of:

a first reading step which reads a predetermined amount of original pixel data which is horizontally continuous from a designated pixel decided on the basis of a zooming magnification out of image data stored in a first memory;

a horizontal thinning step which outputs thinned pixel data by performing 1/n times (n is natural number) thinning processing in a horizontal direction on said original pixel data read by said first reading step when a zooming magnification is equal to or larger than n, and outputting said original pixel data as it is when said zooming magnification is smaller than n, said thinned pixel data being written to a second memory, said second memory further being written with said original pixel data;

a second reading step which reads said original pixel data from said second memory when said zooming magnification is smaller than n, and reading said thinned pixel data from said second memory when said zooming magnification is equal to or larger than n; and a zooming processing step which produces a zoomed image by performing zooming processing on said thinned pixel data or said original pixel data read by said second reading step.

* * * * *